(12) United States Patent
Hirota et al.

(10) Patent No.: US 11,940,015 B2
(45) Date of Patent: Mar. 26, 2024

(54) POWER TRANSMISSION DEVICE

(71) Applicant: GKN Automotive Limited, Birmingham (GB)

(72) Inventors: Isao Hirota, Tochigi (JP); Masato Horiguchi, Tochigi (JP); Manabu Endou, Tochigi (JP)

(73) Assignee: GKN Automotive Limited, Birmingham (GB)

( * ) Notice: Subject to any disclaimer, the term of this patent is extended or adjusted under 35 U.S.C. 154(b) by 0 days.

(21) Appl. No.: 18/346,907

(22) Filed: Jul. 5, 2023

(65) Prior Publication Data

US 2023/0341007 A1    Oct. 26, 2023

Related U.S. Application Data

(63) Continuation of application No. PCT/JP2021/002178, filed on Jan. 22, 2021.

(51) Int. Cl.
*F16D 23/12* (2006.01)
*F16D 11/14* (2006.01)
(Continued)

(52) U.S. Cl.
CPC .............. *F16D 23/12* (2013.01); *F16D 11/14* (2013.01); *F16D 28/00* (2013.01); *F16H 48/24* (2013.01); *F16H 48/34* (2013.01); *F16D 2023/123* (2013.01); *F16H 48/08* (2013.01); *F16H 2048/343* (2013.01)

(58) Field of Classification Search
CPC .......... F16D 23/12; F16D 11/14; F16D 28/00; F16D 2023/123; F16H 48/24; F16H 48/34; F16H 48/08; F16H 2048/343
See application file for complete search history.

(56) References Cited

U.S. PATENT DOCUMENTS 7,905,312 B2 *   3/2011   Kato ...................... F16D 23/12
                                                     180/245
2007/0095628 A1 *  5/2007  Niederbacher ......... F16D 23/12
                                                     192/70.23

FOREIGN PATENT DOCUMENTS

JP       2007278316 A     10/2007
JP       2013245733 A     12/2013
(Continued)

OTHER PUBLICATIONS

International Search Report and Written Opinion for PCT/JP2021/002178 dated Apr. 6, 2021 (8 pages).

*Primary Examiner* — Sherry L Estremsky
(74) *Attorney, Agent, or Firm* — Bejin Bieneman PLC (57) ABSTRACT

A system for using a motor to control a power transmission device for driving a vehicle is provided with a clutch member movable bidirectionally in an axial direction; a base member prevented from rotating about an axis; a counter member axially away from and opposed to the base member, the counter member being restrained from moving in both a circumferential direction and the axial direction; an action member interposed between the base member and the counter member, movable in the axial direction, drivingly coupled with the clutch member, and coupled with the motor to create a rotational motion about the axis; and a cam slope tilting in the circumferential direction and ascending from the base member toward the counter member to convert the rotational motion into a motion of the action member in the axial direction.

8 Claims, 8 Drawing Sheets

(51) Int. Cl.
　　　　*F16D 28/00*　　　(2006.01)
　　　　*F16H 48/24*　　　(2006.01)
　　　　*F16H 48/34*　　　(2012.01)
　　　　*F16H 48/08*　　　(2006.01)

(56) References Cited

FOREIGN PATENT DOCUMENTS

| | | | |
|---|---|---|---|
| JP | 2020193696 | A | 12/2020 |
| KR | 101399227 | B1 * | 5/2014 |
| WO | 2016035129 | A1 | 3/2016 |
| WO | 2017060963 | A1 | 4/2017 |
| WO | 2018109874 | A1 | 6/2018 |

* cited by examiner

FIG.5

POWER TRANSMISSION DEVICE

CROSS-REFERENCE TO RELATED APPLICATIONS

This application is a continuation Application of PCT International Application No. PCT/JP2021/002178 (filed Jan. 22, 2021), the entire contents of which are incorporated herein by reference.

BACKGROUND

Rotary machines applied to vehicles often use clutches for selective engagement and disengagement of operations. A so-called lock-up differential for example has a built-in dog clutch that is typically disconnected to enable differential motion between output axles and, when connected by an external actuator, locks up the differential motion.

The clutch is enclosed in a rotary machine that rotates, and its control by an external element, as it is stationary, requires a special mechanism. Some devices including cam mechanisms using motors or solenoid actuators have been proposed in the past. The following publications disclose related information.

PCT International Publication WO 2017/060963 A1
PCT International Publication WO 2016/035129 A1
PCT International Publication WO 2018/109874 A1

SUMMARY

The disclosure herein relates to a clutch system controlled by a motor, and including a clutch system capable of operating a clutch member bidirectionally in accordance with a rotational angle of the motor.

In existing clutch actuators, even when the motor or the solenoid thereof is powered, a clutch often fails to become connected at least because a cam mechanism is not free from hysteresis, and in some instances clutch teeth may happen to be at inappropriate positions for mutual engagement. Further, even when the power is off, temporary adhesion between the clutch teeth caused by viscosity of lubricant oil or magnetization might delay disengagement thereof. Thus, to prevent unpredictable actions, it may be desired to detect whether the clutch is connected or not.

The device disclosed hereafter has been created in view of the aforementioned issues and, in the device, a rotational angle of a motor represents a travel length of a clutch member, thereby enabling determination as to whether the clutch is connected or disconnected only by measuring the rotational angle.

According to an aspect, a clutch system for using a motor to control a power transmission device for driving a vehicle is provided with: a clutch member movable bidirectionally in an axial direction; a base member prevented from rotating about an axis; a counter member axially away from and opposed to the base member, the counter member being restrained from moving in both a circumferential direction and the axial direction; an action member being interposed between the base member and the counter member, movable in the axial direction, drivingly coupled with the clutch member, and coupled with the motor to create a rotational motion about the axis; and a cam slope tilting in the circumferential direction and ascending from the base member toward the counter member to convert the rotational motion into a motion of the action member in the axial direction.

DESCRIPTION OF EXEMPLARY EMBODIMENTS

Exemplary embodiments will be described hereinafter with reference to the appended drawings. Throughout the following descriptions and appended claims, unless otherwise described, an axis means a central axis of a clutch system, which is normally consistent with a rotation axis of a power transmission device. Drawings are not necessarily to scale and therefore it is particularly noted that dimensional relations are not limited to those drawn therein.

A combination of a clutch system and a motor described below may be combined with a rotary machine such as a differential to constitute a power transmission device for driving a vehicle, and may be used in particular for connecting or disconnecting the clutch from the exterior of the rotary machine to control its function. As should be understood from the following description, by setting the motor into normal rotation or reverse rotation, the clutch can be connected or disconnected and, throughout the process, rotational angles of the motor continuously represent positions of a clutch member.

While embodiments described below concern differentials, the device is applicable to any other rotary machines such as a transmission, a power transfer unit (PTU), or a coupling device. Although a so-called dog clutch provided with dog teeth is exemplified as the clutch, the device is applicable to any other type such as a claw clutch and, more generally, any clutch with a structure not by friction but by mutual meshing to transmit torque, and further a friction clutch such as a multi-plate clutch.

Figure 1:
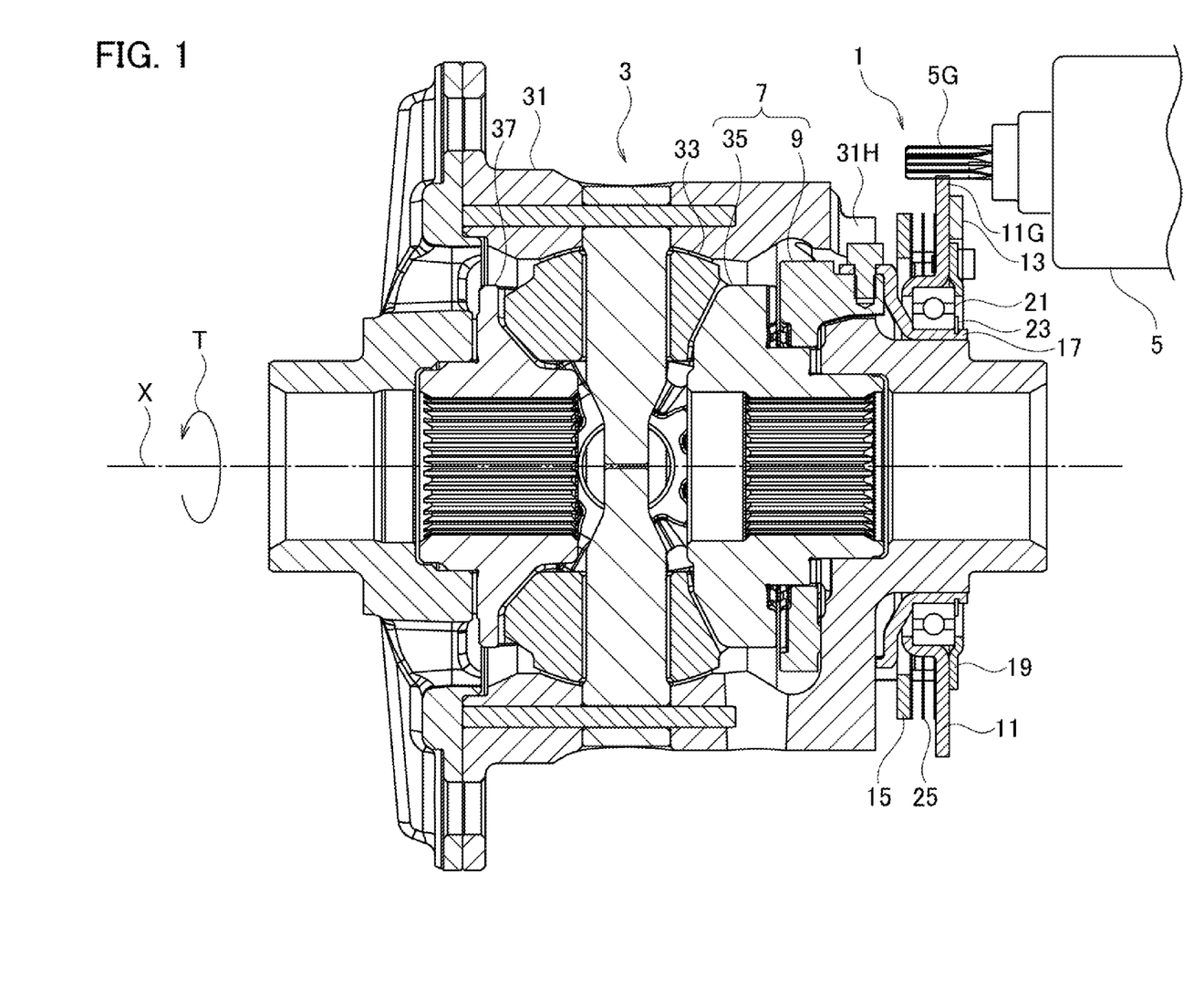
FIG. 1 is a partial sectional elevational view of a differential device including a clutch system according to an embodiment.
Figure 2:
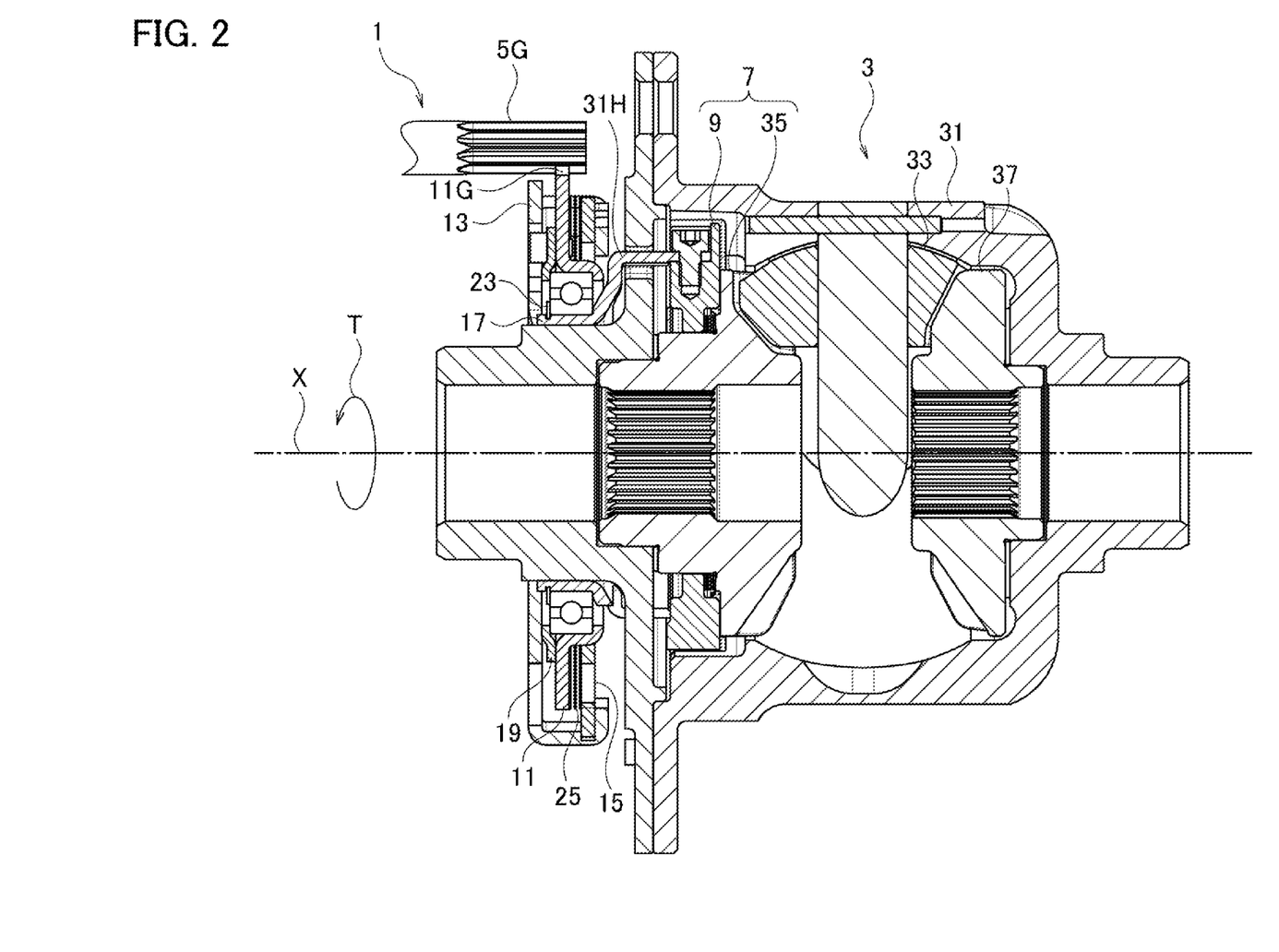
FIG. 2 is a partial sectional elevational view of a differential device including a clutch system according to another embodiment.

Referring mainly to FIGS. 1 and 2, a clutch system 1 is, for the purpose of controlling action of the differential 3, shown combined with a motor 5 to drive a clutch 7.

The differential 3 receives torque from the engine via a ring gear fixed with a flange radially elongated from its casing 31, for example, and thereby rotates about the axis X as illustrated by an arrow T in the drawings. In the illustrated example, the differential 3 is provided with a differential gear set of a bevel gear type, in which pinion gears 33 are rotatably supported by the casing 31, and, as a pair of side gears 35, 37 meshes with the pinion gears, differentially distributes the torque to both axles. When the clutch 7 becomes disengaged, differential motion between the side gears 35, 37 is allowed, whereas the differential motion is locked when connected. Of course, in place of the bevel gear type, any other suitable type such as a face gear or a planetary gear is possible. Moreover, although the examples shown in FIGS. 1 and 2 concern so-called lock-up differentials, so-called free-running differentials may be instead combined with the clutch system 1.

The casing 31 may be formed as a two-piece type which allows division into two pieces, or of course may be formed as an indivisible one-piece type. In the two-piece type, the casing is, at around the flange for example, divided. In either type, the clutch system 1, the motor 5 and the clutch 7 may be disposed opposite to the flange as shown in FIG. 1, or instead may be disposed closer to the flange as shown in FIG. 2.

Figure 3A:
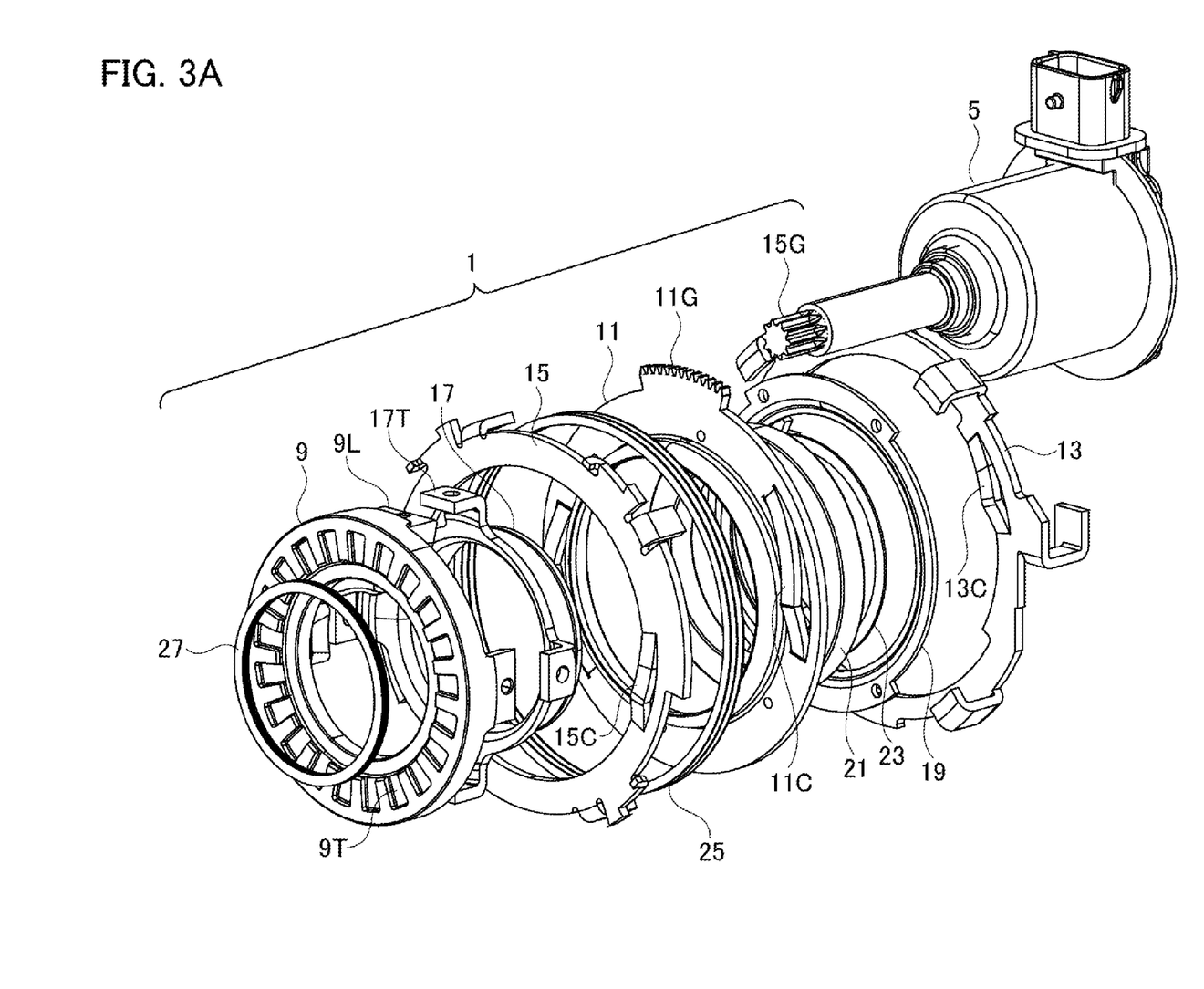
FIG. 3A is an exploded perspective view of a motor and the clutch system.
Figure 3B:
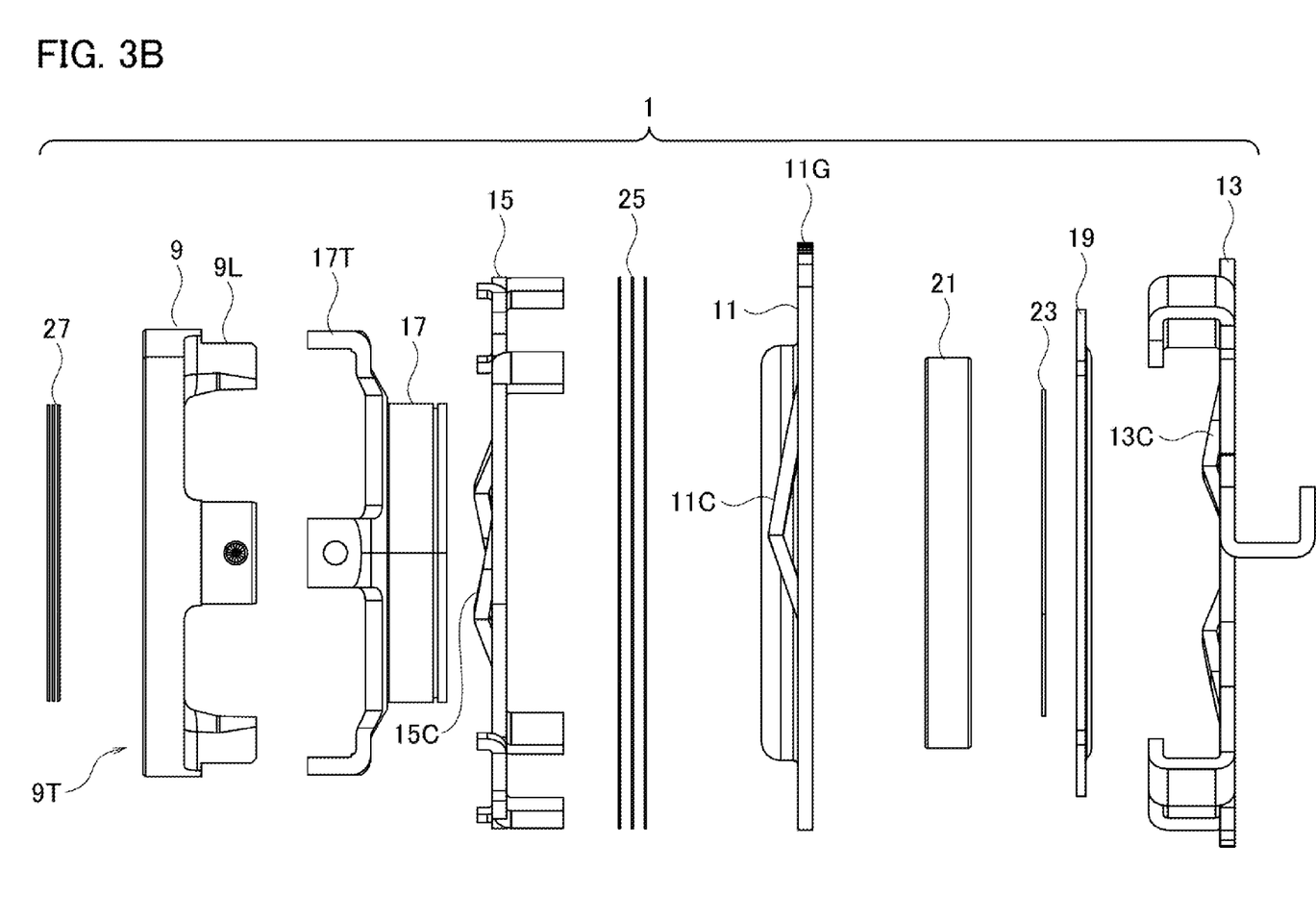
FIG. 3B is an exploded elevational view of the clutch system corresponding to FIG. 3A.

Referring to FIGS. 3A and 3B, the clutch system 1 is generally provided with a base member 13, a counter member 15 axially away therefrom and opposed thereto, and an action member 11 disposed therebetween. The action member 11, the base member 13 and the counter member 15 are all plate members circular around the axis X, and respectively have some structures projecting in the axial direction. To be circular and to be formed from a plate member are not essential but may be beneficial in enabling production by die-cutting a sheet of a structural steel, machining the sheet and press-forming the machined sheet. These elements are so disposed close to but outside the casing 31 and share the common axis X with the casing 31.

The base member 13 is prevented from rotating relative to the vehicle body, particularly the carrier therein for example. The counter member 15 and the base member 13 are engaged with each other, thereby being restrained from moving in both the axial direction and the circumferential direction, or may be fixed. The action member 11 is put between these elements and movable in both the axial direction and the circumferential direction. To turn the action member 11 back to its initial position, in between the counter member 15 and the action member 11 for example, a spring 25 may be interposed for pressing the action member 11 toward the base member 13.

Figure 4A:
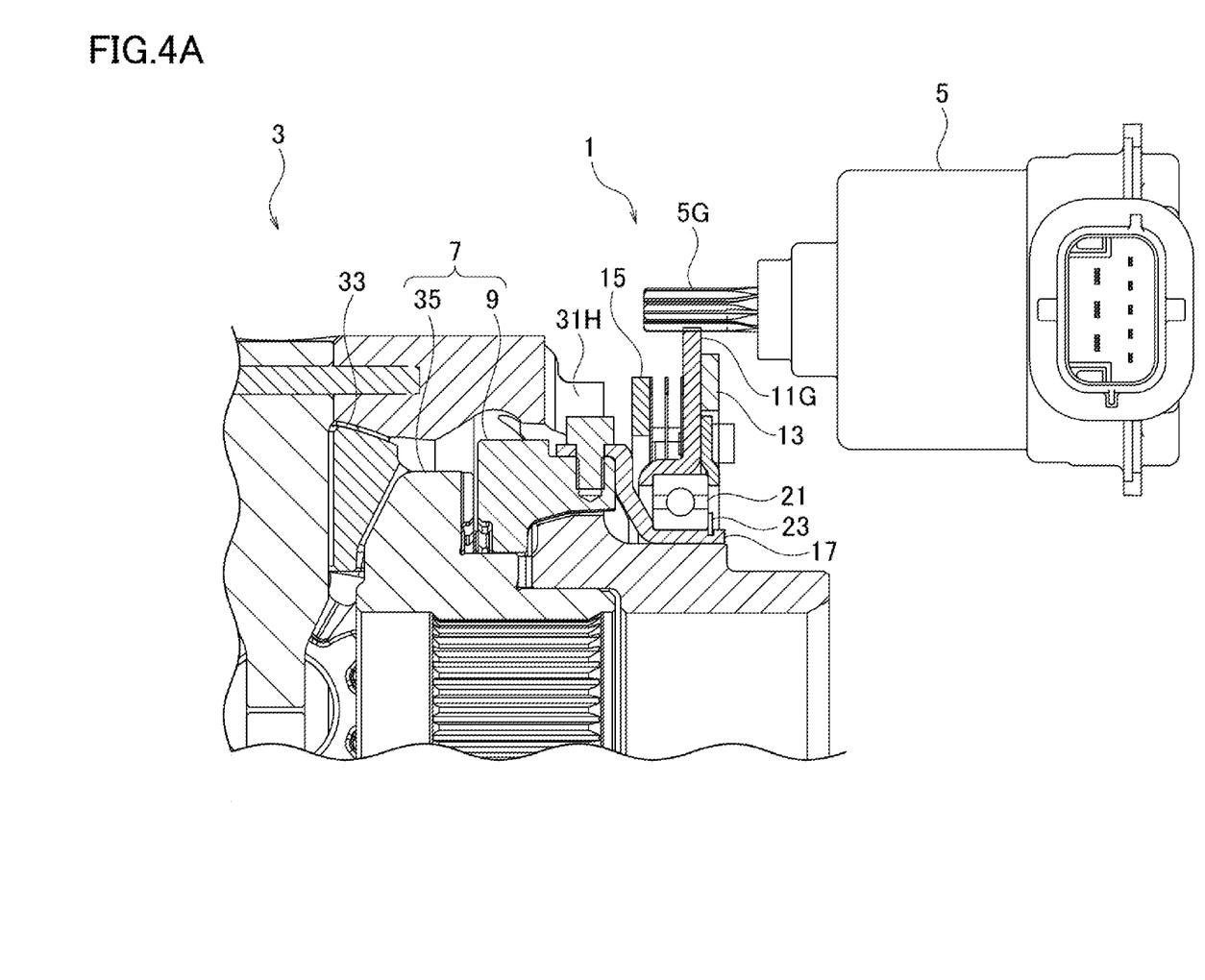
FIG. 4A is a partial sectional elevational view illustrating the motor and the clutch system particularly in detail.

The action member 11 is provided with gear teeth 11G so as to mesh with the motor 5. Any part of the outer periphery of the action member 11 for example may project radially outwardly and its outer periphery may be toothed to form the gear teeth 11G. The arrangement formed thereby is beneficial in forming a structure in which the motor 5 is disposed radially outwardly from the clutch system 1 and its gear shaft 15G is meshed with the toothed outer periphery. If possible, the gear teeth 11G may be formed on any other part so as to arrange the motor 5 at any other position. Referring to FIG. 4A in combination with FIGS. 3A, 3B, as the gear teeth 11G are meshed with the gear shaft 15G and receive rotation of the motor 5, the action member 11 creates rotational motion about the axis X. Needless to say, both normal and reverse rotations are possible.

Figure 4B:
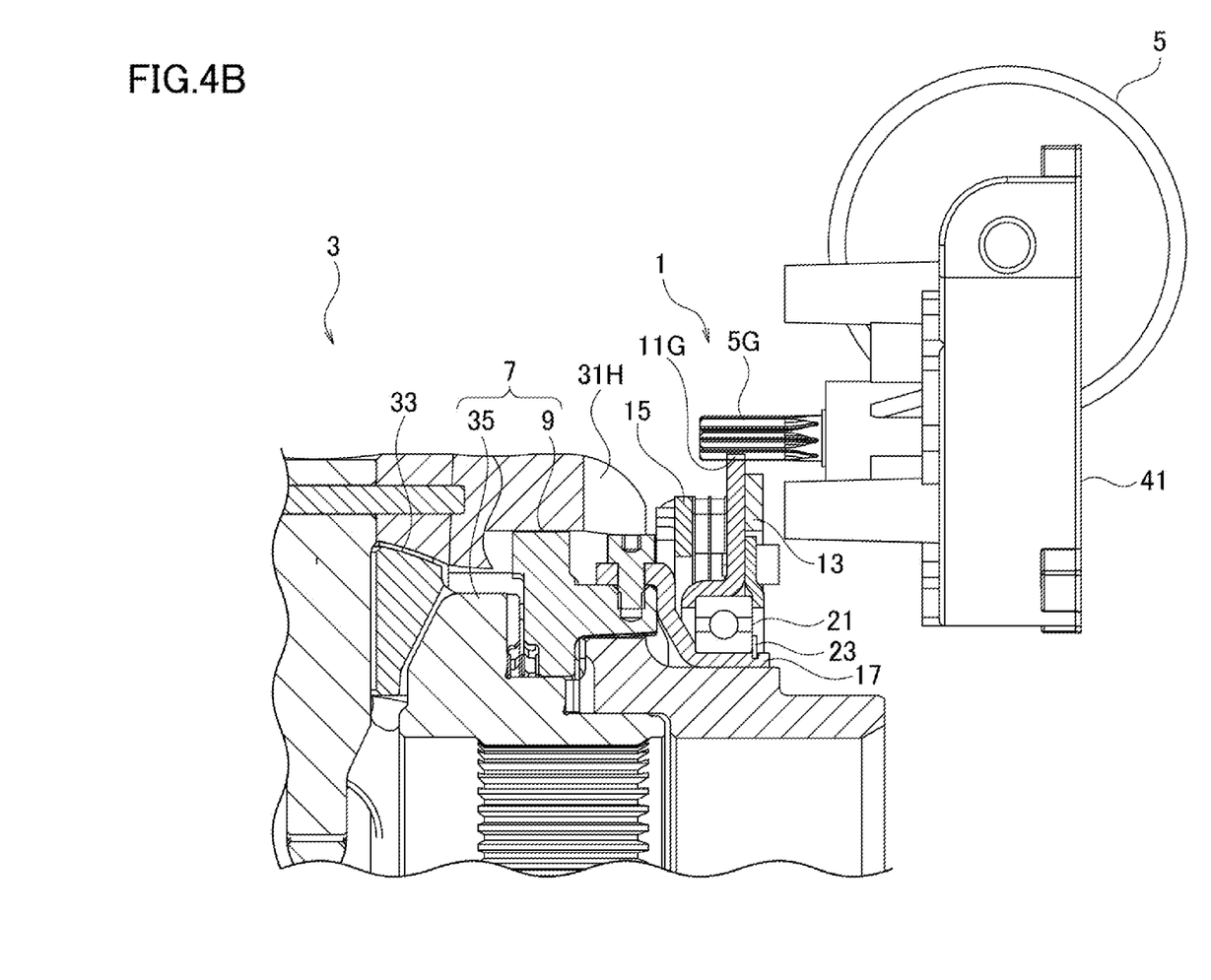
FIG. 4B is a partial sectional elevational view corresponding to FIG. 4A, based on another example.

The motor 5 may be so structured as to output the rotation of the rotor directly to the gear shaft 5G as illustrated in FIG. 4A, but any structure with a gear mechanism is alternatively possible. FIG. 4B, for example, illustrates that the motor 5 outputs the rotation via a worm gear mechanism 41. If the worm gear mechanism 41 intervenes, its own friction functions as resistance to the external force, thereby holding or maintaining the position of the gear teeth 11G. Or, instead of providing the motor 5 with the worm gear mechanism 41, the gear shaft 5G and the gear teeth 11G may constitute a worm gear set. In any case, as the motor 5 is not required to be powered in order to hold the position of the action member 11, the aforementioned constructions are advantageous in light of energy savings.

Figure 4C:
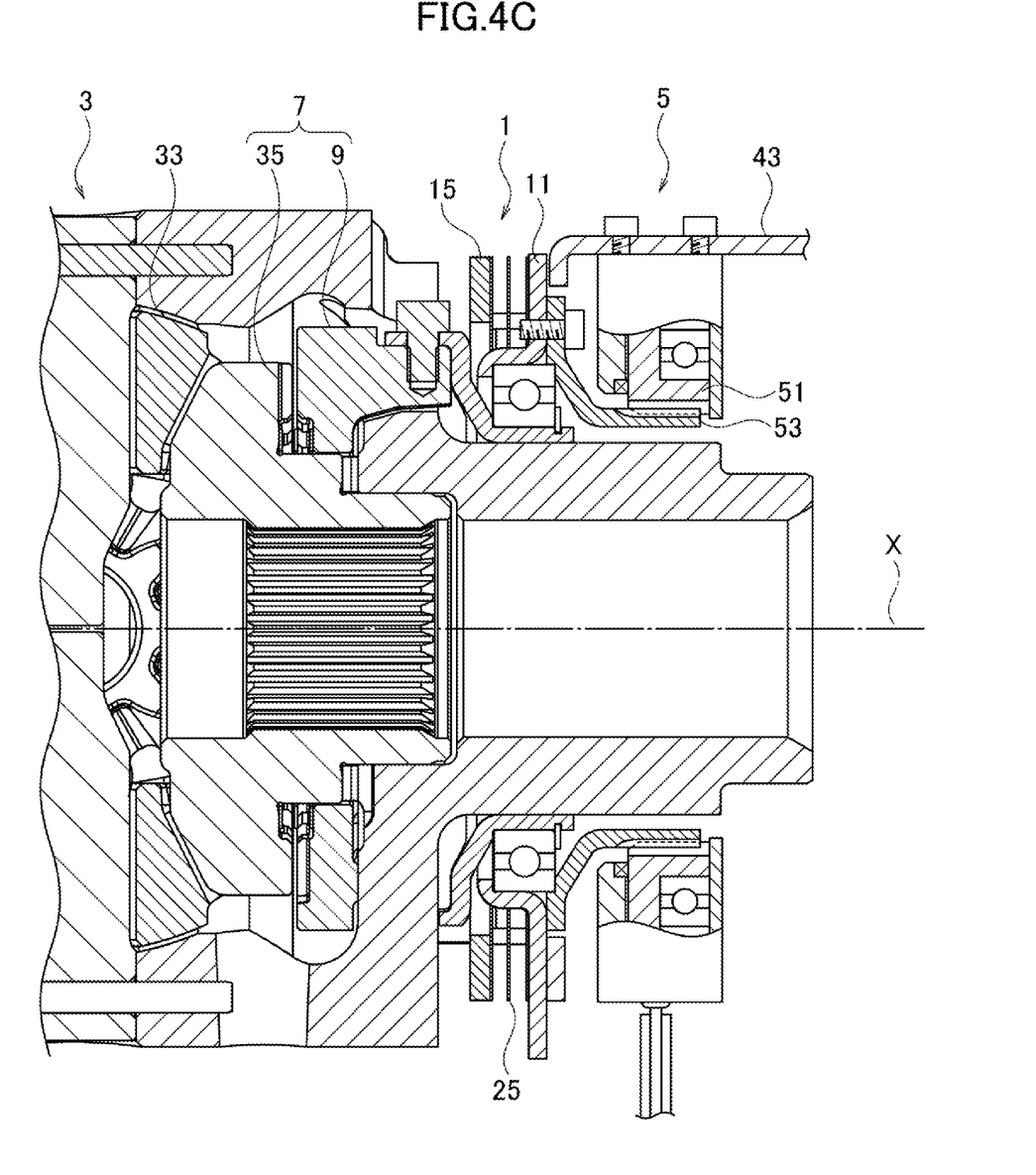
FIG. 4C is a partial sectional elevational view corresponding to FIG. 4A, based on still another example.

Or, as shown as an example in FIG. 4C, the coupling between the motor 5 and the action member 11 may not require the gear teeth 11G. The motor 5 could be an axial gap motor or a radial gap motor having a rotor 51 with a hollow shaft and thereby the motor 5 could be coaxial with the differential 3 and the clutch system 1. The coupling between the rotor 51 and the action member 11 may be established by a rotary member 53 coupled via splines with the rotor 51, for example. The rotary member 53 has a cylinder shape in general, which on its outer periphery, for example, has keys for spline-coupling with the rotor 51, and further has a flange for bolt connection, but its shape is not limited thereto. The rotary member 53 further, in place of a fixation plate 19 as described later, serves as a support for a ball bearing 21. Still further alternatively, the action member 11 and the rotary member 53 may form a unitary body.

The motor 5 is required to be prevented from rotating and the anti-rotation, i.e., securing to prevent rotation, may be established by a bracket 43 fixed to the carrier for example. Anti-rotation of the base member 13 may be also established by the bracket 43, or the base member 13 and the bracket 43 may form a unitary body.

Referring again to FIGS. 3A, 3B, a clutch member 9 is disposed to be endmost in the clutch system 1 and is generally disposed inside the casing 31. The clutch member 9 is, on an end face, provided with an engagement structure such as clutch teeth 9T. In a case where the differential 3 is a lock-up differential, one of the side gears 35 is provided with a corresponding engagement structure, which in combination with the clutch member 9 constitutes the clutch 7. In a case of a free-running differential, as described already, its inner casing is provided with the engagement structure to constitute the clutch 7. The clutch member 9 is rendered movable bidirectionally in the axial direction in the casing 31 and, when away from the side gear 35 (or the inner casing), makes the clutch 7 disengaged but, when moving opposite thereto, makes the clutch 7 engaged. A return spring 27 is, although inessential, applicable for promoting disengagement of the clutch 7.

While the action member 11 may be directly coupled with the clutch member 9, a transfer member 17 may be interposed therebetween to transmit its axial motion to the clutch member 9. The coupling between the clutch member 9 and the transfer member 17 may be achieved by bolts and, for bolt coupling, legs 9L extended from the clutch member 9, or tabs 17T extended from the action member 11, or both, may be used. As shown in FIG. 1 for example, the tabs 17T may pass through an opening 31H relatively widely opened on the end of the casing 31 and be exposed to the exterior, and these exposed parts may be used for the bolt coupling. Alternatively, as shown as an example in FIG. 2, openings 31H may be narrow through-holes and the tabs 17T pass through these through-holes to intrude into the casing 31 and are coupled with the clutch member 9 inside. In any case, as described later in more detail, the opening(s) 31H is (are) not necessary to have a cam structure for assisting engagement of the clutch member 9; therefore its production is simplified, and does not damage the strength and the stiffness of the casing 31. The narrow through-holes as shown in FIG. 2 are beneficial in maintaining the strength and the stiffness.

Referring again to FIGS. 3A, 3B, the transfer member 17 and the action member 11 are coupled together although the ball bearing 21 is interposed therebetween so that the transfer member 17 is rotatable relative to the action member 11. A bearing of another type may be used in place of the ball bearing 21, or the action member 11 may be slidably coupled with the transfer member 17 as long as smooth rotation is provided. In a case where the ball bearing 21 is in use, any suitable structure adapted for the inner periphery of the action member 11 allowing the ball bearing 21 to fit therein and engage therewith is possible. Further, it is possible to use the fixation plate 19 and put the ball bearing 21 in between the fixation plate 19 and the action member 11 so that these elements unitarily move in the axial direction. The ball bearing 21 fixed to the transfer member 17 and a snap ring 23 is an example of such fixation. The transfer member 17 is thus rotatable relative to the action member 11 while the bidirectional motions of the action member 11 in the axial direction are transmitted to the clutch member 9.

Figure 5:
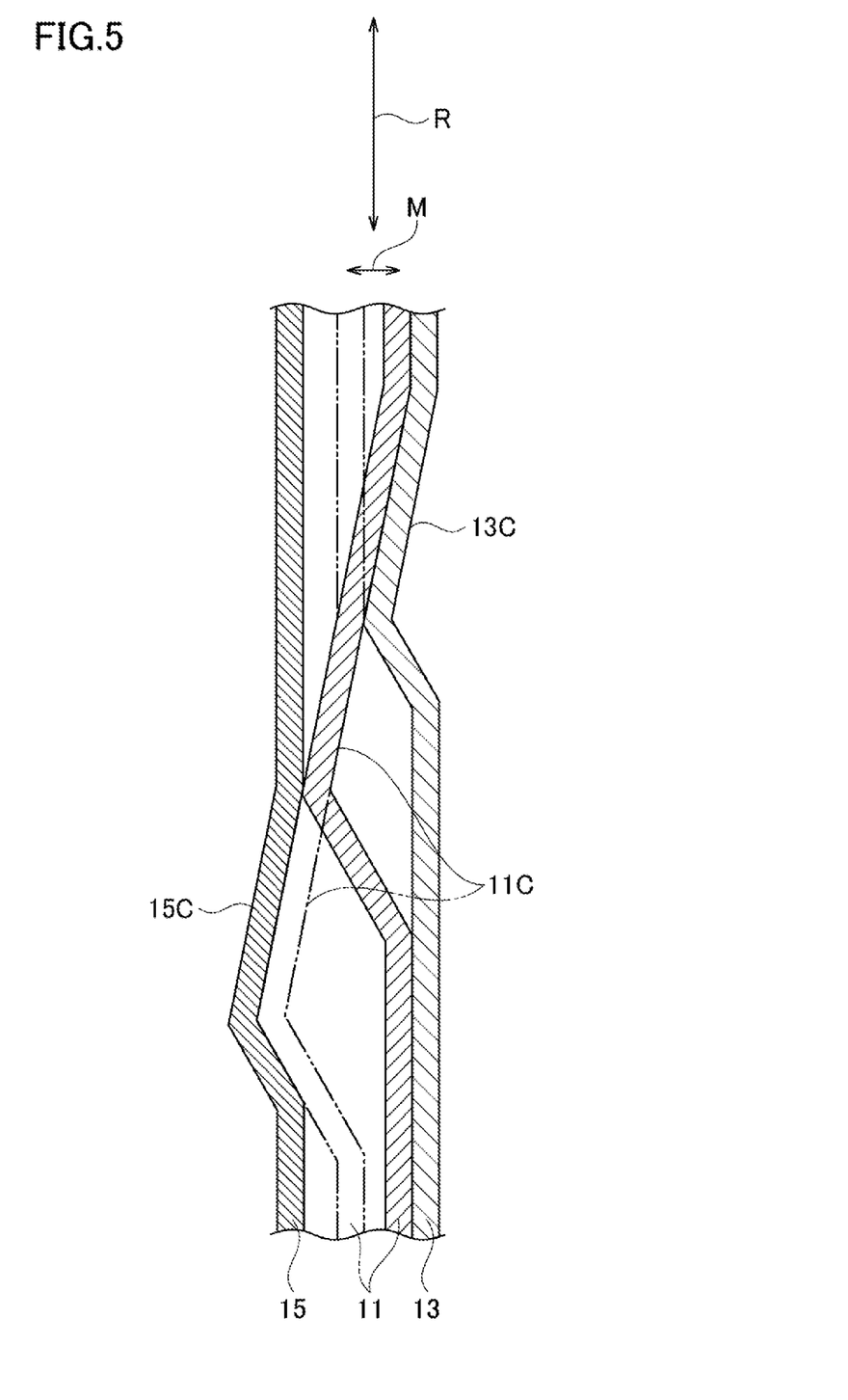
FIG. 5 is a sectional view of the clutch system for illustrating actions of an action member, taken along its circumferential direction.

Referring to FIG. 5 in combination with FIGS. 3A, 3B, the combination of the members 11, 13 and 15 has a structure for converting the rotational motion of the action member 11 by the motor 5 into a motion in the axial direction. An example is cam slopes 13C respectively tilting and ascending from the base member 13 toward the counter member 15. When the action member 11 creates a rotational motion R in the circumferential direction, the cam slopes 13C guide the action member 11 and thereby make it into a motion M in the axial direction. As described already, this structure can be readily produced by press forming. Or, although not shown, the cam slopes 13C may be separate bodies from the base member 13.

The action member 11 has a structure related to the cam slopes 13C, and an example thereof is slopes 11C respectively corresponding to the cam slopes 13C. The slopes 11C can be so dimensioned as to be steadily in face contact with the cam slopes 13C. Further corresponding to these elements, the counter member 15 may be also provided with second cam slopes 15C. The slopes 11C of the action member 11 steadily or continuously maintain face contact with both these cam slopes 13C and 15C. This structure prevents the axial motion M from creating hysteresis relative to the rotational motion R. More specifically, the rotational angle of the motor 5 correctly represents the axial motion of the clutch member 9.

As the structure of the action member 11 related to the cam slopes 13C, in place of the slopes 11C, respective openings receiving the cam slopes 13C can be provided. As the cam slopes 13C partly fit in and slide on the openings opened on the action member 11, the openings guide the action member 11. In this case, the second cam slopes 15C may be slopes tilting toward the base member 13, as contrary to those shown in FIG. 5, and both the cam slopes 11C, 15C in any case may steadily or continuously have contact with, and thereby guide, the action member 11. This structure, rather than merely converting the rotational motion R into the axial motion M, prevents the hysteresis.

As will be understood from the description above, when the motor 5 makes the action member 11 rotate about the axis X, the action member 11 in response to the rotation moves in the axial direction to drive the clutch member 9. As the rotational angle of the rotor of the motor 5 has a one-to-one relation to the travel length of the clutch member 9 in the axial direction, whether the clutch 7 is engaged or disengaged can be determined by only detecting the rotational angle. Further, the rotational angle can be readily detected by reading inductance change in the motor for example, or electrically detected if any structure such as an encoder is attached to the rotor. In sum, any additional device is not required for determining whether the clutch is connected or disconnected. Further, even though any external force acts on the clutch member 9, the cam structure exhibits a sufficient resistant ability. More specifically, the disclosed device does not require any particular structure for retaining the connection of the clutch 7. This facilitates production of the casing 31 and does not sacrifice its strength and stiffness.

Although certain exemplary embodiments are described above, modifications and variations of the embodiments will occur to those skilled in the art, in light of the above teachings.

What is claimed is:

1. A system for using a motor to control a power transmission device for driving a vehicle, comprising:
    a clutch member movable bidirectionally in an axial direction;
    a base member prevented from rotating about an axis;
    a counter member axially away from and opposed to the base member, the counter member being restrained from moving in both a circumferential direction and the axial direction;
    an action member interposed between the base member and the counter member, movable in the axial direction, drivingly coupled with the clutch member, and coupled with the motor to create a rotational motion about the axis; and
    a cam slope tilting in the circumferential direction and ascending from the base member toward the counter member to convert the rotational motion into a motion of the action member in the axial direction.

2. The system of claim 1, further comprising:
    a spring interposed between the counter member and the action member to press the action member toward the base member.

3. The system of claim 1, wherein the cam slope forms a unitary body with the base member.

4. The system of claim 1, further comprising:
    a transfer member coupled with the action member and the clutch member to transmit the motion in the axial direction to the clutch member.

5. The system of claim 1, wherein the counter member unitarily includes a second cam slope in contact with and guiding the action member.

6. The system of claim 5, wherein the action member includes a slope in face contact with both the cam slope and the second cam slope.

7. The system of claim 1, wherein the action member includes a gear in mesh with the motor or a rotary member linked via splines to a rotor of the motor so as to be driven by the motor to create the rotational motion.

8. The system of claim 1, further comprising a transmission device that includes:
    a differential gear set including a pair of side gears differentially outputting a torque;
    wherein one of the side gears or an inner casing supporting the differential gear set includes clutch teeth meshing with the clutch member to, in combination with the clutch member, constitute a clutch.

* * * * *